United States Patent
De Vost et al.

[15] 3,706,229
[45] Dec. 19, 1972

[54] PRESSURE GAGE FOR RECORDING PEAK PRESSURES

[72] Inventors: Valmore F. De Vost; John W. Simkins, both of Silver Spring, Md.

[73] Assignee: The United States of America as represented by the Secretary of the Navy

[22] Filed: Feb. 1, 1971

[21] Appl. No.: 111,392

[52] U.S. Cl. ................................... 73/396, 73/406
[51] Int. Cl. ................................... G01l 7/08
[58] Field of Search ........... 73/396, 407, 406, 35, 12; 116/114 AH

[56] References Cited

UNITED STATES PATENTS 2,976,732  3/1961  Hautly ................. 116/114 AH
3,203,229  8/1965  Pevar .................. 73/406 X

*Primary Examiner*—Donald O. Woodiel
*Attorney*—R. S. Sciascia, J. A. Cooke and R. J. Erickson

[57] ABSTRACT

A pressure gage for recording peak pressures including a pair of pressure responsive flexible diaphragms fixed in a spaced, opposed relationship. One of the diaphragms includes a surface coated with a non-drying dye. The diaphragms are positioned a selectable predetermined fixed distance from each other and are adapted to come into mutual contact upon the application of external pressure. The contact causes an imprint to be formed in the dye of a size proportional to the peak pressure experienced by the gage.

7 Claims, 3 Drawing Figures

PATENTED DEC 19 1972 3,706,229

INVENTORS
Valmore F. DeVost
John W. Simkins

BY  M.G. Raskin  AGENT

J.A. Cooke  ATTORNEY 3,706,229

PRESSURE GAGE FOR RECORDING PEAK PRESSURES

BACKGROUND OF THE INVENTION

This invention relates generally to pressure gages and more specifically to a peak reading pressure gage operable in high shock environments.

It has become necessary in the recent past to obtain peak pressure measurements of relatively small values, i.e., from 30 to 100 psi, in environments subject to high shocks. More specifically, for example, it has become necessary to determine whether the high pressures of an expanding gas in a gun bore will leak into the base of a projectile fired from that bore thereby creating the possibility of a dangerous detonation of the projectile within the bore. However, pressure gages of the conventional type positioned within the projectile body to measure the internal pressure within the projectile during firing do not function satisfactorily due to the high shock present in the gun barrel at times approaching up to 100,000 $g$'s at a terminal velocity of 3,000 feet per second.

Diaphragm devices comprising either a single flexible disc, which will deflect in response to a differential pressure on the sides thereof, or including a pair of flexible metal discs joined together to form an expansible chamber, which will expand and contract due to a pressure on the outside of the chamber, are well known in the art. These devices are not suited for use in the above described high-shock application due to the necessity of constructing the diaphragm members of relatively thin material in order to insure sufficiently large deflections in response to relatively small pressure changes so that the deflections could be monitored. The thinness of the diaphragm members renders these prior art devices quite fragile and it has been found that use of these conventional prior art diaphragm devices in high shock environments is impractical. Further, in using conventional diaphragm devices, it is necessary to monitor the deflections of the diaphragm members, as mentioned hereinabove, usually by electrical means, in order to record the pressure readings. In the described application, i.e., that of positioning a pressure sensing device within a projectile which is fired from the bore of a gun, electrical monitoring of the pressure sensing element has been made impractical.

Other devices have been employed in efforts to alleviate the difficulties inherent with the use of diaphragm devices. One such device, commonly referred to as a ball crusher gage, includes a small metallic sphere positioned in a cylindrical container immediately below a slideable piston of a known mass. This pressure gage may be positioned within the projectile interior and upon the firing of the projectile, the pressure would cause the piston to move into the sphere causing deformation thereof. The amount of deformation would be an indication of the pressure present within the projectile. Unfortunately, however, the great difference in density between the piston and the surrounding air causes this type of gage to behave more as an accelerometer than as a pressure gage in that the large acceleration forces present during the projectile firing rather than the pressure increase causes the piston to move into the sphere. Thus, a need has arisen for an instrument to measure relatively low peak pressures in high shock environments.

SUMMARY OF THE INVENTION

Accordingly, one object of this invention is to provide a new and improved peak reading pressure gage.

Another object of the invention is the provision of a new and improved pressure gage of the flexible diaphragm type.

Still another object of the present invention is to provide a new and improved flexible diaphragm pressure gage operable under high shock environments.

A further object of the instant invention is to provide a new and improved flexible diaphragm pressure gage which records peak pressure readings in a high shock environment.

Briefly, in accordance with one embodiment of this invention, these and other objects are attained by joining two flexible diaphragm members along their peripheries so that the members are separated from each other by a predetermined distance. The separation distance is determined such that upon the application of external pressure and the consequent deflection of the diaphragm members toward each other, the diaphragm members will come into partial contact with each other. One of the diaphragm members is coated with a non-drying dye such that, upon coming into contact with the dry diaphragm, it leaves a circular imprint on the coated diaphragm. The imprint diameter is proportional to the peak pressure exerted on the diaphragm members.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENTS

Figure 1:
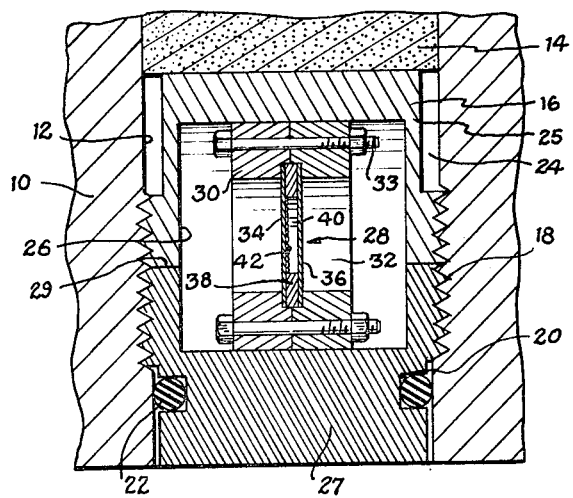
FIG. 1 is an elevation view in section of the base of a projectile with a pressure gage of the present invention housed therein.

Referring now to the drawings wherein like reference characters designate identical or corresponding parts throughout the several views, and more particularly to FIG. 1 thereof, wherein the central part of the base portion 10 of a projectile is shown having a partially threaded bore 12 formed therein. A charge of explosive 14 fills an upper portion of the bore 12 and is situated directly above a fuze housing 16, from which the fuze mechanism has been removed, threaded within the bore. The fuze housing 16 shown in FIG. 1 has been modified to serve as a fixture for the pressure gage of the present invention and thereby adapted to test for gas leakages in a manner to be described hereinafter. The fuze housing 16 has a generally cylindrical shape having a threaded portion 18 formed approximately midway along the length thereof and an annular groove 20 circumferentially extending therearound immediately subjacent to the threaded portion 18. As stated hereinabove, the fuze housing 16 is threadedly fastened within the bore 12 so that its upper surface is immediately adjacent the explosive charge 14.

It has been found that some projectiles of the type shown in FIG. 1 have prematurely initiated prior to exiting from the gun bore due to a premature explosion of explosive charge 14. A possible cause of the in-bore initiation was that the high gas pressures present in the gun bore immediately behind the projectile might be sufficient to violate the seal formed by O-ring 22 thereby enabling the high pressure gas, at times approximating 40,000 psi, to leak into an annular space 24 defined by the outer surface of fuze housing 16 and the bore 12. The fuze housing 16 is adapted to provide a housing for the pressure gage of the present invention to determine whether, in fact, this high pressure was present beyond the fluid seal formed by O-ring 22. The modified fuze housing 16 is formed in two parts, 25 and 27, which, upon assembly, mate at interface 29. Each housing part has a cup-shaped cavity formed therein so that, upon assembly, a cylindrical cavity 26 is formed centrally within the fuze housing within which a pressure gage 28 is positioned. Pressure gage 28 is fixed within the cylindrical cavity 26 by means of a pair of block members 30 and 32 fastened together by conventional means, such for example, as by bolts 33, with the gage 28 secured therebetween. By employing the aforementioned apparatus, should any gas pressure in fact be present beyond the seal 22, it would act on the pressure gage through the interface 29.

Figure 2:
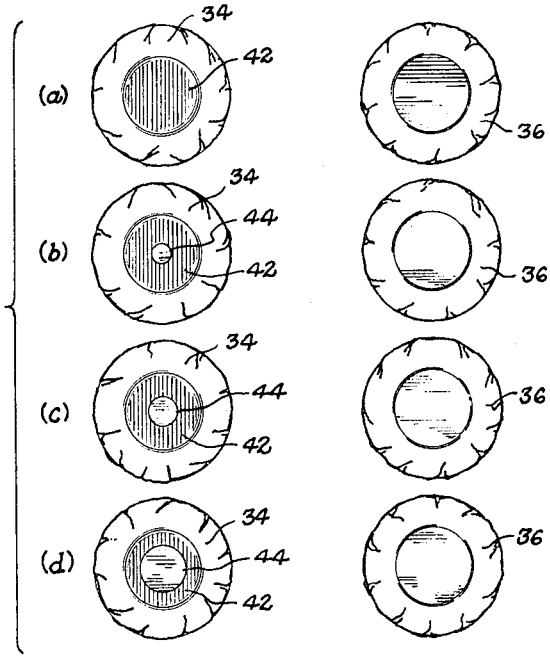
FIGS. 2(a) through (d) are a series of plan views of pressure gage diaphragms after being exposed to various pressures.

The pressure gage 28 in accordance with the first embodiment of the present invention includes a pair of circular diaphragm members 34 and 36 fixed to either side of a spacer member 38 such, for example, as an annular washer. The diaphragm members 34 and 36 may, for present purposes, be formed of a metallic material such, for example, as aluminum. The space 40 defined by the inner surfaces of the diaphragm members and the inner annular surface of the spacer member 38 is hermetically sealed from external pressure by coating the outer surface of the pressure gage with a silicon grease. The inner surface of one of the diaphragm members, in this case, diaphragm member 34, is coated with a non-drying dye 42 such, for example, as Prussian Blue, while the inner surface of the remaining diaphragm member 36 is kept dry. The distance between the inner surfaces of the diaphragm members, fixed by the thickness of the spacer member 38 is predetermined by the expected pressures to which the pressure gage will be exposed. Under pressure, the diaphragm members deflect toward each other and the spacing is predetermined so that they will come into contact with each other thereby forming a circular imprint in the dye. Referring to FIG. 2, wherein a series of individual diaphragm members are shown, FIG. 2(a) shows a particular pressure gage which had been exposed to a pressure not sufficiently high to cause the two diaphragm members to come into contact. In FIG. 2(b), a circular imprint 44 is shown which resulted from the partial mutual contact of the two diaphragm members. The diameter of the imprint 44 is proportional to the peak external pressure exerted on the diaphragm members. FIGS. 2(c) and (d) indicate steadily increasing pressures as indicated by the increase in the diameters of the respective imprints 44.

By appropriate static calibration, curves may be plotted associating various imprint diameters with corresponding pressure readings.

The particular pressure range to which the pressure gage 28 will be exposed controls the thickness of the diaphragm members and the thickness of the spacer member 38 as discussed hereinabove. For example, in one case, the pressure range which was to be expected was from 30 to 100 psi. For this case, aluminum foil diaphragm members having a thickness of 0.001 inches were clamped 0.04 inches apart. The extremely low mass of the gage, in the present embodiment approaching 5 milligrams, enables the gage to be relatively impervious to the shock attendant in dynamic pressure environment.

As seen in FIG. 1, the pressure gage 28 is oriented in the direction of the shock to offset fuze setback and landing shock inertial forces. Under shock, both diaphragm members normally move in the same direction and therefore are not likely to come in contact with each other except when acted upon by external pneumatic pressures of sufficient magnitude.

Figure 3:
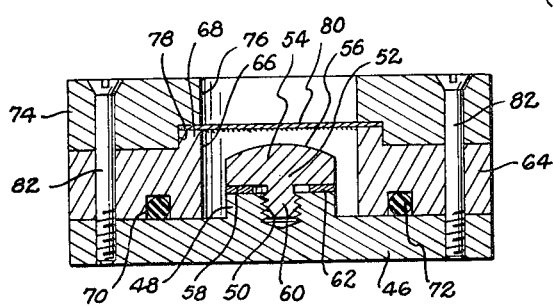
FIG. 3 is an elevation view in section of a second embodiment of the pressure gage of the present invention.

An alternative embodiment of the present invention, particularly suited to underwater use, is shown in FIG. 3. In this embodiment, a first outer block member 46 has a raised portion 48 centrally formed thereon including a threaded bore 50 formed therein. An anvil member 52, defined by a head portion 54 having an upper spherical surface 56 and opposed planar surface 58 is threadedly affixed within threaded bore 50 by means of an integral threaded shaft 60. A spacer member 62 comprising a flat annular member such, for example, as a conventional washer, is positioned between the upper surface of the raised portion 48 and the planar surface 58 of the anvil member 52. A second middle block member 64 having a central bore 66 formed therethrough of a diameter larger than the diameter of the anvil member is positioned suprajacent to the lowermost block member 46. An annular raised flange 68 is formed about the upper perimeter of the bore 66 and an annular groove 70 is formed on the lower surface of the second block member in which an O-ring 72 is housed. Finally, a third outer block member 74 is positioned suprajacent the second block member 64 and also includes a centrally formed bore 76 of the same diameter as the bore 66. A peripheral notch 78 is formed about the bore 76 at the lower surface of the third block member of a complementary size adapted to receive the annular flange 68 of the second block member 64.

In assembly, a diaphragm member 80 of the type described hereinbefore is positioned within the notch 78 and is held therein by the cooperation of the annular flange 68 and the notch. The surfaces of the notch 78 and the flange 68 may be coated with silicon grease to provide an airtight seal therebetween. The three block members are clamped together by conventional means such, for example, as by screws 82. By the cooperation of the O-ring 72 and the upper portion of the first outer block member 46, a fluid seal is formed between the space, defined by the lower surface of the diaphragm member 80 and the anvil member 52, and the external environment. The spherical surface 56 of the anvil member is coated with a non-drying dye of the type described hereinbefore. Upon exposure to pressure, the diaphragm member 80 is caused to deflect toward the anvil member 52 and is adapted, in a similar manner to the diaphragm members of the first embodiment, to come into contact therewith. The amount of contact obtained is proportional to the external pressure and an imprint will be formed as before on the diaphragm member 80. The diameter of the imprint will be a record of the peak pressure noted by the pressure gage. The dimensions of the diaphragm member 80 and the height of the spacer member 62 may be varied to accommodate various expected pressure ranges. Thus, the anvil member may be placed in a closer position with respect to the diaphragm member 80 if smaller pressure ranges are expected.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A pressure gage for measuring peak pressures comprising:
    a first flexible diaphragm member having a planar surface coated with a non-drying dye;
    a spacer-washer having one side thereof contacting the planar surface at the outer periphery of said diaphragm to in sealing relationship; and
    a second member contacting the other side of said spacer-washer in sealing relationship and in axial spaced alignment with said diaphragm;
    thereby creating a sealed chamber, whereupon application of external pressure causes said flexible diaphragm to contact said second member making a dye imprint thereon of a size proportional to the peak pressure.

2. A pressure gage for measuring peak pressures as recited in claim 1 wherein said second member comprises a second flexible diaphragm member.

3. A pressure gage as recited in claim 1 wherein said diaphragm members are secured to said annular spacer member by the cooperation of a pair of opposed block members clamped together having said pressure gage positioned therebetween.

4. A pressure gage as recited in claim 3 wherein said diaphragm members have a relatively small mass whereby said gage is made impervious to shock.

5. A pressure gage as recited in claim 4 wherein said diaphragm members have a mass of about 5 milligrams.

6. A pressure gage for measuring peak pressures as recited in claim 1 wherein said second member comprises an anvil member including a head portion having a generally spherical surface formed thereon opposed to said planar surface.

7. A pressure gage as recited in claim 6 wherein:
    said anvil member further includes a threaded shaft extending from said head portion, whereby said anvil member may be selectively fixed with respect to said first flexible diaphragm member by threadedly fastening said anvil member to a block member; and
    an interchangeable annular spacer member positioned between said head portion and said block member.

* * * * *